United States Patent
Schilling

(10) Patent No.: US 7,142,582 B2
(45) Date of Patent: Nov. 28, 2006

(54) RECEIVING AND SELECTIVELY TRANSMITTING FREQUENCY HOPPED DATA SIGNALS USING A PLURALITY OF ANTENNAS

(75) Inventor: Donald L. Schilling, Sands Point, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 842 days.

(21) Appl. No.: 10/209,588

(22) Filed: Jul. 30, 2002

(65) Prior Publication Data

US 2003/0012258 A1 Jan. 16, 2003

Related U.S. Application Data

(63) Continuation of application No. 10/057,333, filed on Oct. 29, 2001, now Pat. No. 6,507,600, which is a continuation of application No. 09/631,183, filed on Aug. 2, 2000, now Pat. No. 6,327,297, which is a continuation of application No. 09/264,505, filed on Mar. 8, 1999, now Pat. No. 6,128,328, which is a continuation of application No. 08/840,737, filed on Apr. 16, 1997, now Pat. No. 5,881,094, which is a continuation of application No. 08/542,346, filed on Oct. 12, 1995, now Pat. No. 5,657,343, which is a continuation of application No. 08/297,449, filed on Aug. 29, 1994, now Pat. No. 5,459,759, which is a continuation of application No. 08/019,114, filed on Feb. 17, 1993, now abandoned.

(51) Int. Cl.
*H04B 1/69* (2006.01)
*H04B 1/707* (2006.01)
*H04B 1/713* (2006.01)

(52) U.S. Cl. .................. 375/134; 375/133; 375/135

(58) Field of Classification Search ................ 375/132, 375/133, 134, 135, 136, 137; 370/330; 342/368; 455/422.1
See application file for complete search history.

(56) References Cited

U.S. PATENT DOCUMENTS

| | | | |
|---|---|---|---|
| 4,222,115 A | 9/1980 | Cooper et al. | |
| 4,479,226 A | 10/1984 | Prabhu et al. | |
| 4,545,059 A | * 10/1985 | Spinks et al. | ................ 375/133 |
| 4,710,944 A | 12/1987 | Nossen | |
| 4,750,036 A | 6/1988 | Martinez | |
| 4,803,738 A | 2/1989 | Ikeda | |
| 4,829,540 A | 5/1989 | Waggener, Sr. et al. | |
| 4,850,036 A | 7/1989 | Smith | |
| 4,901,307 A | 2/1990 | Gilhousen et al. | |

(Continued)

FOREIGN PATENT DOCUMENTS

GB 2228163 8/1990

(Continued)

OTHER PUBLICATIONS

John Proakis, Digital Communications, published in 1995, copyright 1995, 1989, 1983 by McGraw-Hill, Inc., pp. 468-470.

*Primary Examiner*—Phuong Phu
(74) *Attorney, Agent, or Firm*—Volpe and Koenig, P.C.

(57) ABSTRACT

A remote unit transmits data by Frequency hopping over a set of frequencies to a base station. A plurality of antennas at the base station receives the transmitted frequency hopped data. An optimal combining of each antenna's received hopped data for a particular frequency is determined. Data is selectively transmitted using the plurality of antennas from the base station to the remote unit over the particular frequency. The selectively transmitting is selected using the optimal combining.

6 Claims, 10 Drawing Sheets

U.S. PATENT DOCUMENTS

| | | | |
|---|---|---|---|
| 4,947,452 A | 8/1990 | Hattori et al. | |
| 5,056,109 A | 10/1991 | Gilhousen et al. | |
| 5,073,900 A | 12/1991 | Mallinckrodt | |
| 5,101,501 A | 3/1992 | Gilhousen et al. | |
| 5,103,459 A | 4/1992 | Gilhousen et al. | |
| 5,129,096 A | 7/1992 | Burns | |
| 5,164,958 A | 11/1992 | Omura | |
| 5,177,604 A | 1/1993 | Martinez | |
| 5,247,699 A | 9/1993 | Hartman | |
| 5,257,398 A | 10/1993 | Schaeffer | |
| 5,301,188 A | 4/1994 | Kotzin et al. | |
| 5,428,602 A * | 6/1995 | Kemppainen | 370/330 |
| 5,428,815 A | 6/1995 | Grube | |
| 5,440,636 A | 8/1995 | Herrick | |
| 5,448,621 A | 9/1995 | Knudsen | |
| 5,448,751 A | 9/1995 | Takenaka et al. | |
| 5,455,962 A * | 10/1995 | Kotzin | 455/422.1 |
| 5,459,759 A | 10/1995 | Schilling | |
| 5,543,806 A * | 8/1996 | Wilkinson | 342/368 |
| 5,657,343 A | 8/1997 | Schilling | 375/202 |
| 5,758,090 A | 5/1998 | Doner | |
| 5,881,094 A | 3/1999 | Schilling | 375/202 |
| 6,128,328 A | 10/2000 | Schilling | |
| 6,151,310 A | 11/2000 | Dent | 370/330 |
| 6,212,385 B1 | 4/2001 | Thomas et al. | 455/561 |
| 6,212,405 B1 | 4/2001 | Jiang et al. | 455/561 |
| 6,327,297 B1 | 12/2001 | Schilling | 375/134 |

FOREIGN PATENT DOCUMENTS

| | | |
|---|---|---|
| WO | 9306685 | 4/1993 |
| WO | 9307702 | 4/1993 |

\* cited by examiner

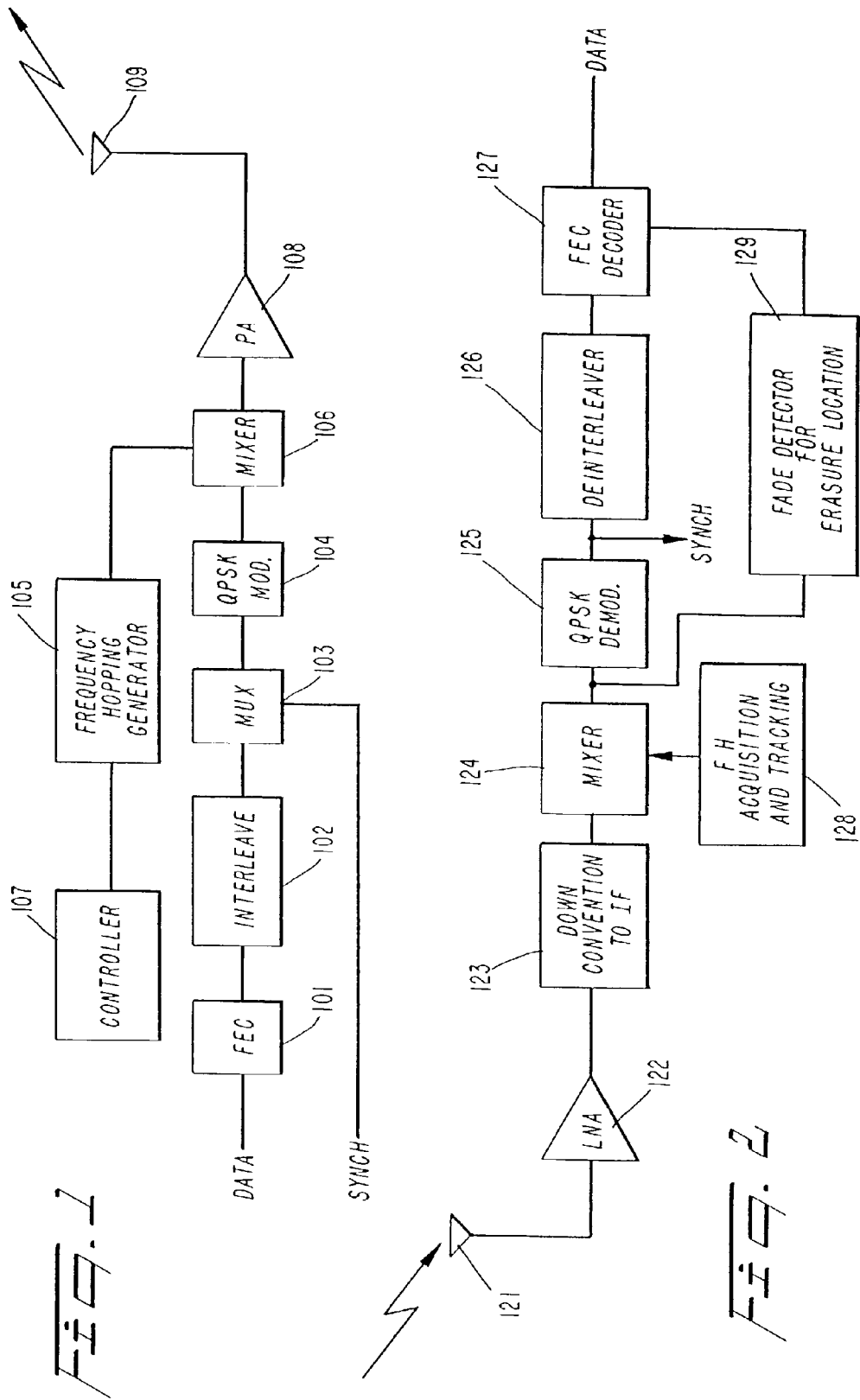

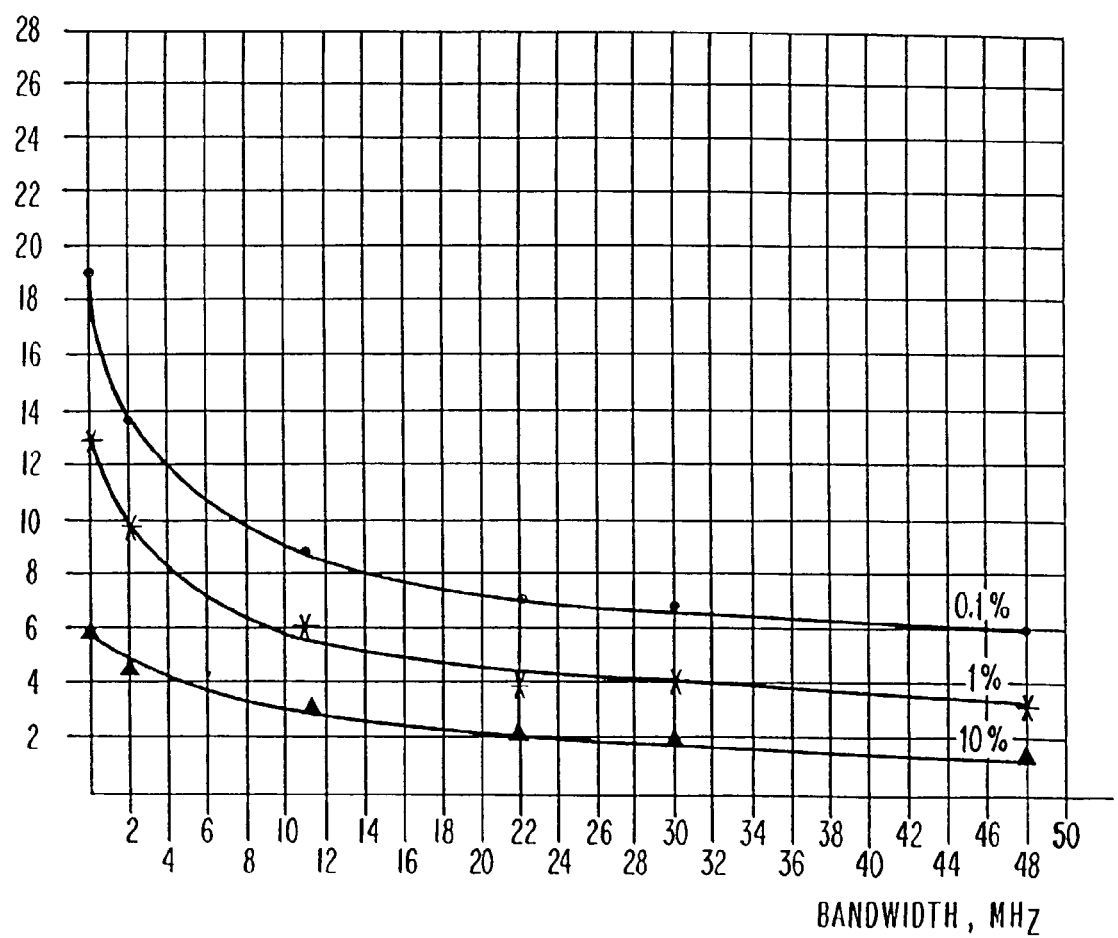

RECEIVING AND SELECTIVELY TRANSMITTING FREQUENCY HOPPED DATA SIGNALS USING A PLURALITY OF ANTENNAS

CROSS REFERENCE TO RELATED APPLICATIONS

This application a continuation of application Ser. No. 10/057,333, Filed Oct. 29, 2001 now U.S. Pat. No. 6,507,600; which is a continuation of application Ser. No. 09/631,183, filed on Aug. 2, 2000 now U.S. Pat. No. 6,327,297; which is a continuation of application Ser. No. 09/264,505, filed on Mar. 8, 1999, which issued on Oct. 3, 2000 as U.S. Pat. No. 6,128,328; which is a continuation of application Ser. No. 08/840,737, filed on Apr. 16, 1997, which issued on Mar. 9, 1999 as U.S. Pat. No. 5,881,094; which is a continuation of application Ser. No. 08/542,346, filed on Oct. 12, 1995, which issued on Aug. 12, 1997 as U.S. Pat. No. 5,657,343; which is a continuation of application Ser. No. 08/297,449, filed on Aug. 29, 1994, which issued on Oct. 17, 1995 as U.S. Pat. No. 5,459,759; which is a continuation of application Ser. No. 08/019,114, filed on Feb. 17, 1993, which is now abandoned.

BACKGROUND

This invention relates to spread spectrum communications, and more particularly to a frequency hopping, code division multiple access, microcellular or cellular communications system, in which the maximum capacity per sector can approach or exceed the total bandwidth of the system divided by the bandwidth occupied by the frequency hopping signal during any dwell. This ratio is called the processing gain.

The frequency spectrum is extremely congested. To ensure that the worldwide need for increased communication services is met, more spectrum must be found. In an attempt to meet these needs, the Federal Communications Commission (FCC) has set aside the frequency bands of 1850–1990 MHz, 2110–2150 MHz, and 2160 2200 MHz, for emerging technology services. The 1850–1990 MHz band has been set aside for Personal Communication Services (PCS). Additionally, the FCC has allocated spectrum under part 15 of the FCC rules, for spread spectrum use.

PCS is expected to become, during the 1990s, a business of significantly more than $100 billion, annually. PCS is a One Phone concept, in which a single phone can be used in the home in lieu of a cordless phone; in the street with a wireless local loop; in the vehicle with a cellular type system; and, in the office with a wireless private branch exchange (PBX). The One Phone will provide wired-line quality voice and integrated service digital network (ISDN) data rates, with wireless convenience. Used with an intelligent network, a call placed to a user will reach the user, no matter where the user is located.

The PCS frequency band is also inhabited by licensed, fixed service, microwave users. These microwave users transmit data point-to-point using towers approximately 150–200 feet high, separated by about 10–20 miles. Their systems employ one watt power amplifiers and four degree beamwidth antennas.

In earlier experiments, a direct-sequence spread spectrum CDMA system was demonstrated to share, i.e., overlay, the spectrum with the microwave users without causing significant attenuation, by limiting the capacity of the CDMA system. The co-sharing proposal centered about using a 48 MHz bandwidth for the CDMA system. Thus, the power reaching the fixed microwave receiver from a PCS user was attenuated by 7 dB, i.e., 4.8. Additional attenuation resulted because the PCS user is not within the narrow beamwidth of the fixed service microwave user's antenna. The FCC's ruling limits the bandwidth to 15–20 MHz full duplex. Thus, a 15–20 MHz band-can be allocated for transmission and a second 15–20 MHz band can be allocated for reception. This ruling reduces the direct-sequence spread spectrum capacity by about 4 to 5 dB. These results are shown in Table I for experimental data taken in the suburbs of Orlando and Houston, and in densely urban New York, using a 48 MHz bandwidth. The results presented in this table for the 15 MHz bandwidth were obtained by multiplying the first column by $^{15}\!/\!_{48}$. The reason that more users could overlay in New York City is that the tall buildings blocked the line-of-sight path between a PCS user and microwave user. Hence, any PCS signal reaching the microwave antenna is severely attenuated.

TABLE 1

| | Number of Users/Base Station | |
|---|---|---|
| | Experimental Results (48 MHz Bandwidth) | Calculated Results (15 MHz Bandwidth) |
| Houston | 46 | 14 |
| Orlando | 34 | 10 |
| New York City | 538 | 168 |

If no overlay were needed, i.e., all microwave users were removed from the frequency band, then the maximum capacity, C, of a PCS microcellular system could be $$C \sim f_c/f_b. \tag{1}$$

where $f_c$ is the chip rate of the direct sequence (DS) spread spectrum system and $f_b$ is the data rate. Using a data rate of 32 kilobits per second (kb/s) to ensure toll quality voice and a bandwidth of 48 MHz, each cell could service up to 538 simultaneous calls while a 15 MHz bandwidth system could handle up to 168 simultaneous calls.

In order to eventually achieve the much higher capacity possible in the non-overlay mode, the FCC has given the microwave users 3–10 years to leave the PCS band and move to a higher, frequency band. During the interim period, overlay will enable the PCS business to develop in a reasonable fashion and provide or a smooth transition.

Frequency hopping (FH) CDMA is an alternate approach which allows sharing the band with the microwave users by hopping over them, i.e., by excluding frequencies used by the microwave users. A frequency hopping signal typically is a quadrature phase shift keyed (QPSK) or binary frequency shift keyed (BFSK) signal which changes frequency at regular time intervals, called the hop duration. If the bandwidth occupied by the frequency hopping signal during any dwell were $f_b$ and the total bandwidth of the system were B, then the system capacity, C, ideally becomes $$C = B/f_b \tag{2}$$

Comparing Equations (1) and (2), the FH/CDMA and the DS/CDMA systems have approximately the same capacity if $f_c = B$. Typically, however, the capacity of a FH/CDMA system is limited to a much lower value than given by Equation (2). The reasons for this are:

1. If N frequency-hopping users change frequency at random times and with a pseudo random sequence, then the probability of two users landing on the same frequency at the same time, thus causing a collision and producing errors, increases rapidly with N, thereby limiting N to about 10% of capacity.

2. If users in one cell used all C frequency "bins", then the users in adjacent cells would have to use the same frequencies, thereby interfering with one another. To avoid such interference, frequency reuse could be employed, thereby limiting the number of users to about 1/7, or 15% capacity.

Accordingly, there exists a need for a system which avoids the limitations disclosed above.

SUMMARY

A remote unit transmits data by Frequency hopping over a set of frequencies to a base station. A plurality of antennas at the base station receives the transmitted frequency hopped data. An optimal combining of each antenna's received hopped data for a particular frequency is determined. Data is selectively transmitted using the plurality of antennas from the base station to the remote unit over the particular frequency. The selectively transmitting is selected using the optimal combining.

BRIEF DESCRIPTION OF THE DRAWINGS

The accompanying drawings, which are incorporated in and constitute a part of the specification, illustrate preferred embodiments of the invention, and together with the description serve to explain the principles of the invention.

FIG. 1 is a block diagram of a FH/CDMA transmitter;

FIG. 2 is a block diagram of a FH/CDMA receiver;

FIG. 17 is a redrawn plot of FIG. 15.

DETAILED DESCRIPTION OF THE PREFERRED EMBODIMENTS

Figure 3:
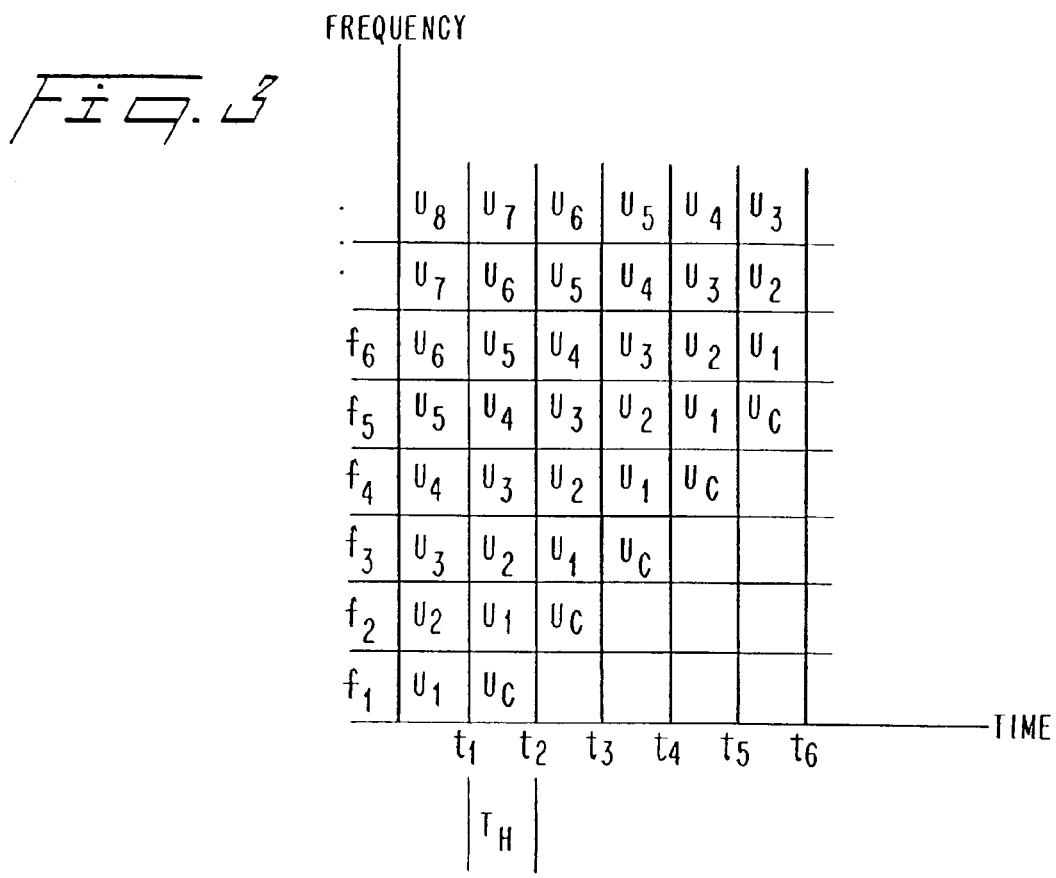
FIG. 3 illustrates the frequency time schedule to avoid intracell interference.

Reference now is made in detail to the present preferred embodiments of the invention, examples of which are illustrated in the accompanying drawings, wherein like reference numerals indicate like elements throughout the several views.

This specification discloses the invention and initial performance analysis of an FH/CDMA microcellular communication system. The invention has a general object of maximizing channel capacity. The resulting invention, therefore, while practical, is nonetheless complex; it makes use of coordinated frequency subbands and antenna sectors to minimize multiple access interference. Thus, while a system of this type requires, for. example, more handoffs than might otherwise be needed, the system results in a highly effective usage of the frequency spectrum.

Frequency-hopping code division multiple access (FH/CDMA) utilizes an allocated spectrum by periodically changing a channel frequency, that is, the carrier frequency of the transmitted signal. The "changing" is called "hopping". The frequency hopping communications system and method disclosed herein select; those carrier frequencies, used by the frequency-hopping transmitter, in a pseudorandom manner, i.e., from a table lookup. A frequency of any shared user, such as a pre-existing microwave user, who has a carrier frequency which has a bandwidth falling in the allocated spectrum, however, is locked out, i.e., not hopped on, by the frequency-hopping transmitter in order to eliminate interference with the shared-user system.

The frequency-hopping communications system and method has particular use for maximizing channel capacity, i.e., having the optimum number of users per cell, in an FH/CDMA cellular infrastructure. FH/CDMA technology may be less expensive than a competing direct sequence spread spectrum code division multiple access (DS/CDMA) system employing direct sequence modulation a combination of frequency hopping with direct sequence (FH/DS) CDMA system also is possible in which hopping is used to ensure that the DS/CDMA system does not interfere with any existing user.

The frequency-hopping communications system and method use plurality of frequency-hopping signals communicating simultaneously with a plurality of remote units, respectively, using an allocated band of frequencies. The overall bandwidth of the allocated band of frequencies is designated herein as a system bandwidth B. The system bandwidth B is divided into N sets of frequencies. Each set of the N sets of frequencies does not have the same frequencies as other sets of the N sets of frequencies.

The remote units may be mobile or in a fixed, stationary location. Message data are communicated between the base stations and the remote units. Message data include, but are not limited to, digitized voice, computer data, facsimile data, video data, etc. Base-message data are defined herein to be message data originating from a base station, and remote-message data are defined herein to be message data originating from a remote unit. Thus, the base station communicates base-message data to the plurality of remote units. A remote unit communicates remote message data to the base station.

The term "base" is used as a prefix to indicate that an element is located at the base station, or that a signal originates from a base station. The term "remote" is used as a prefix to indicate that an element is located at a remote unit, or that a signal originates from the remote unit.

The present invention is taught using a base-station transmitter and a remote-unit receiver. Based on these teachings, a person skilled in the art would know that concepts of concentric regions and antenna sectoring can be used in a reciprocal manner, with a remote-unit transmitter and a base station receiver.

In the exemplary arrangement shown in FIG. 1, each base station has base-modulator means, base-hopping means, base controller means, base-power means and base-antenna means. The base modulator means may be embodied as a base modulator 104, which modulates base-message data using phase shift keying (PSK) modulation, frequency shift keying (FS K) modulation, or any of the type of modulation suitable for a FH/CDMA system. The PSK modulation maybe any of binary phase shift keying (BPSK) modulation, quadrature phase shift keying (QPSK) modulation, M-ary phase shift keying (MPSK) modulation where M is larger than four, or variants of differential phase shift keying (DPSK) modulation. This disclosure teaches the invention, by way of example, with QPSK modulation. It is well known to those skilled in the art that other modulation types are equivalent and may be substituted for QPSK modulation.

As illustratively shown in FIG. 1, base-message data may be processed with a forward error correction (FEC) code by an FEC encoder 101, and bits of the base-message data may be interleaved by bit interleaver 102. The bit interleaver 102 is coupled to the FEC encoder 101, and the FEC encoder 101 has an input for the base-message data. A base multiplexer 103 is shown with an input for a base-synchronization signal, and is coupled to the base interleaver 102. A synchronization channel or pilot signal optionally can be sent with the base-message data by multiplexing a base-synchronization signal or pilot signal with the base message data. For example, a set of frequencies may be set aside, and those frequencies could be reserved for hopping the pilot signal. The resulting multiplexed signal, or the base message data if it were not multiplexed with a base synchronization signal, is modulated by the base modulator 104. The base modulator 104 converts the base-message data to a forth suitable for sending over radio waves. As mentioned previously, that form may be QPSK modulation.

The base-hopping means frequency hops the converted-base message data for a given remote user over a set of frequencies assigned to the particular-concentric region in which resides that remote user. The resulting signal is a frequency-hopped signal. In FIG. 1, the base-hopping means is embodied as a frequency-hopping (FH) signal generator 105, coupled to a base mixer 106. The base mixer 106 is coupled to the base modulator 104.

The base station has base-hopping means for hopping on a plurality of frequencies, simultaneously. Each of a plurality of remote units receives a respective signal from the base station on a different frequency, from the other remote units, at any dwell of a hop. The set of frequencies used for communicating from the base station to the remote unit may be in the same band as the set of frequencies used by the remote unit to communicate to the base station. Alternatively, the set of frequencies used for communicating from the base station to the remote unit may be in a band separate and distinct from the band having the set of frequencies used by the remote unit to communicate to the base station.

In response to the selected-remote unit being located in the particular-concentric region, the base-controller means controls the set of frequencies used by the base-hopping means. The base controller means may be embodied as part of the FH controller 107, which assigns the set of frequencies used by the FH signal generator 105. The controller 107 may be a microprocessor or other digital signal processing circuit or chip.

The base-power means amplifies the frequency-hopped signal to be transmitted from the base station to each remote unit. The base power means is embodied as a base-power amplifier 108. The base-power amplifier 108 is coupled to the base mixer 106. The base-power amplifier 108 is optional, if sufficient power were available at the output of the base mixer 107.

The base-antenna means is coupled to the base-power means. The base-antenna means may be embodied as an omnidirectional antenna, or as a directional antenna 109. In a preferred embodiment, by way of example, the base station may also have six directional antennas which divide the coverage area into six sectors of 60° per sector. Each directional antenna 109 provides the directional coverage for each sector, respectively. The base antenna 109 radiates the frequency-hopped signal over the coverage area, or over a sector of the coverage area if directional antennas were employed. In this case the total capacity of the system is increased by six.

Each of the remote units, as illustrated in FIG. 2, has a remote antenna 121, and remote-receiver means. The remote antenna receives the frequency-hopped signal, and the remote receiver means recovers from the frequency-hopped signal the base-message data.

The remote-receiver means may include remote-acquisition-and-tracking means and remote demodulator means. The remote acquisition-and-tracking means acquires and tracks the frequency hopped signal, to generate a dehopped signal. The remote demodulator means is coupled to said remote-acquisition-and tracking means, and demodulates the dehopped signal into the base-message data.

Technology for building a receiver for receiving a frequency-hopped signal is well known in the art. In FIG. 2, by way of example, the remote-receiver means may include low noise amplifier (LNA) 122, down converter to an intermediate frequency (IF) 123, acquisition-and-tracking means, a demodulator 125, bit deinterleaver 126, FEC decoder 127, and fade detector 129. The acquisition-and-tracking means is embodied as mixer 124 and FH acquisition-and-tracking circuit 128.

The FEC encoder 101 of FIG. 1 and the FEC decoder 127 in FIG. 2 may use many of the error correction code techniques. Those described in U.S. Pat. No. 4,796,260 entitled SM FEC AND DETECTION CODE, U.S. Pat. No. 4,849,976 entitled PASM AND TASM FORWARD ERROR CORRECTION AND DETECTION CODE, U.S. Pat. No. 4,847,842 entitled SM CODEC FOR PHASE MODULATION, and U.S. Pat. No. 4,849,974 entitled PASM AND TASM FORWARD ERROR CORRECTION AND DETECTION CODE, which are all incorporation herein by reference, are well suited for this invention.

The low noise amplifier 122 is coupled between the remote antenna 121 and the down converter 123. The bit deinterleaver 126 is coupled between the demodulator 125 and the FEC decoder 127. The mixer 124 is coupled between the down converter 123 and the demodulator 125, and to the FH acquisition-and-tracking circuit 128.

In order to prohibit collisions, all of the base stations are synchronized. The plurality of remote units are synchronized to the base stations and hence to each other. In addition, each remote unit in a cell transmits at a frequency which is different from those of all other remote units, as illustrated in FIG. 3. Referring to FIG. 3, during a first hop, a first remote unit, $u_1$, transmits at frequency $f_1$, a second remote unit $u_2$ at frequency $f_2$, etc. During a second hop, the first remote unit u1 transmits at $f_2$, the second remote unit $u_2$ at $f_3$, etc. Hence, to have C simultaneous conversations, requires a bandwidth $B=Cf_b$, and each communication within a cell, i.e., intra-cell conversation, can, in principle, occur without collision.

Concentric Regions to Reduce Interference

Figure 4:
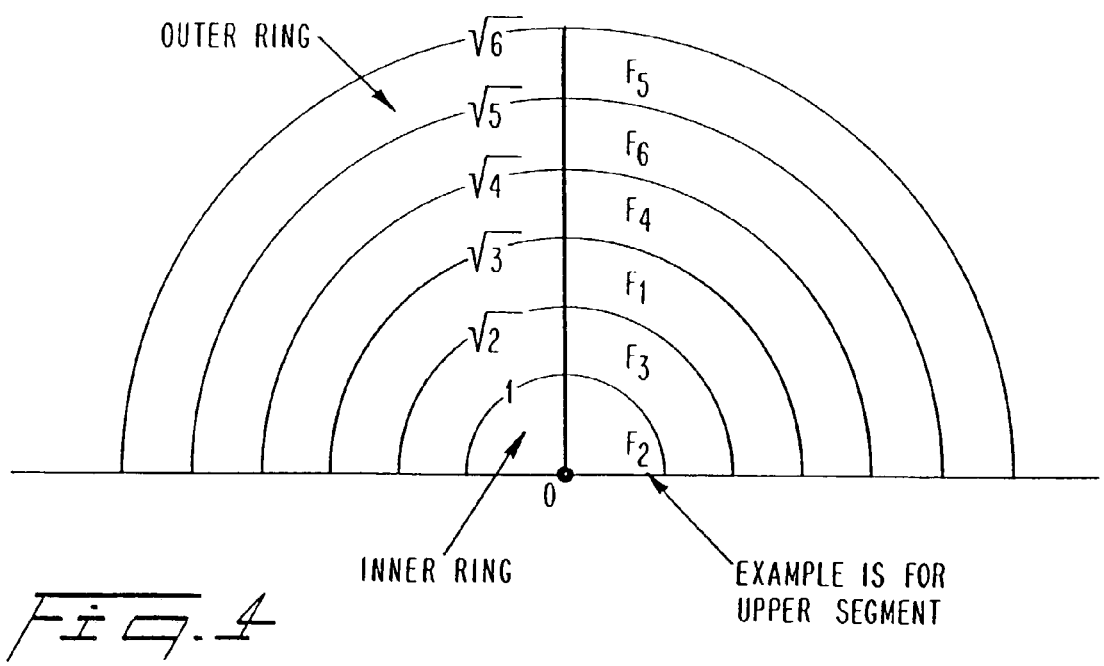
FIG. 4 illustrates the radius of a cell for achieving a constant user density.
Figure 5:
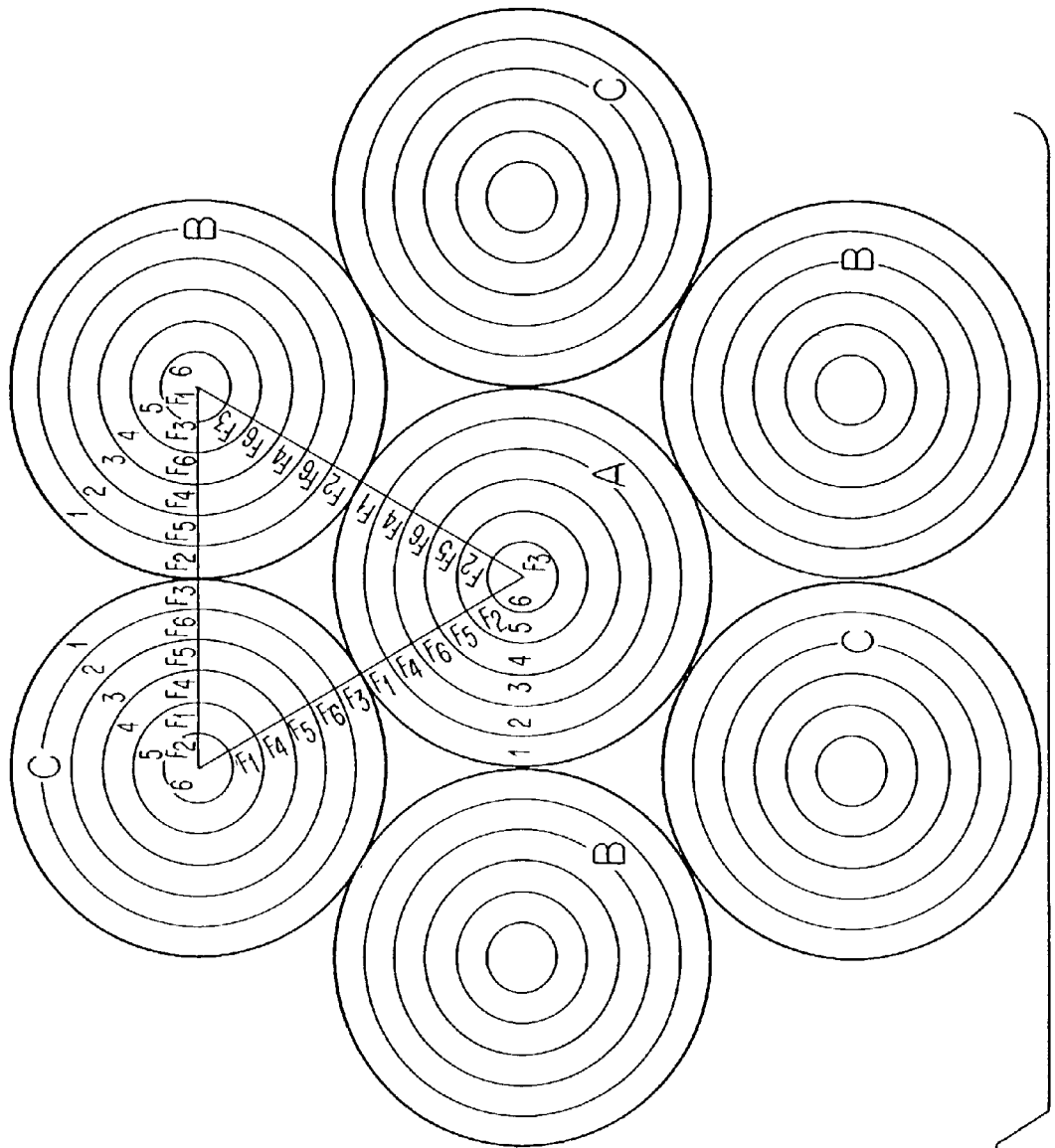
FIG. 5 illustrates FH/CDMA cells using concentric regions with concentric frequency bands.

In an attempt to prevent interference between cells, i.e., intercellular interference, each of the base stations has a coverage area divided into a plurality of N concentric regions. As illustratively shown in FIG. 5, the cell may be divided into six concentric regions, illustrated as concentric rings, about a plurality of base stations. The cells in FIG. 5 are shown as circles rather than as the more typical hexagons for simplicity. Thus, FIG. 5 appears to indicate that there are regions between cells in which there can be no users. This is obviously not the case, but is the result of the artistic liberty taken in drawing the cell shape. In addition, the concentric regions appear to have equal radii. However, to ensure that the user density in each concentric region is constant, one can appropriately adjust the radii of the concentric regions as shown in FIG. 4.

The base station can determine the distance at which the remote unit is-located from the base station using any of many different techniques. The base station, for example, can use a command channel of the FH/CDMA system for sending a timing or mark signal. The remote unit may act like a repeater, and relay back to the base station the timing or mark signal on a return command channel. The base station can determine the distance of the remote unit by the round trip time for the mark signal to travel from the base station, to the remote unit, and back to the base, station. Alternatively, a remote unit may relay location information to the base station through a command channel. The remote unit may determine its location using well-known geolocation techniques, with reference to two, three, or more, base stations, for example.

In the exemplary arrangement shown in FIG. 5, each concentric region is assigned one of the N sets of frequencies. Each base station communicates with all of the remote units located within its cell. The system bandwidth B, by way of example, is divided into six sets of frequencies and one set of frequencies is allocated to each concentric region. Typically this set exceeds the bandwidth required per user, say, $f_b$ for QPSK, so that a number of users can reside in each ring. Thus, remote unit u, in cell A, at a distance $p_4$ from the base station is given a frequency $f_{5,i}$, falling within the band of frequencies $F_5$ allocated to that concentric region. FIG. 5 shows that the band of frequencies marked $F_5$ in cell A is at a different radius from the base station than the band of frequencies $F_5$ in cells B or C. The reason for this difference is to minimize the intercellular interference and thereby reduce the probability of error. Note that a mobile user in cell A at frequency $f_{5,1}$ in band $F_5$ when transmitting to its base receives mobile-to-base interference from the six remote units at frequency $f_{5,1}$, in band $F_5$ in the six surrounding cells. Interference caused by remote units in more distant cells can be neglected, as the signal strength from remote units in those, more distant, cells to the base of cell A are severely attenuated since signal power may decrease by approximately the $4^{th}$ power of the distance.

In order to understand why different system configurations were selected, it is useful to calculate the worst-case signal to-interference (S/I) ratio at the base station of cell A. Consider that each band is allocated 15 MHz/6=2.5 MHz. These frequencies are not necessarily contiguous. Then, in band $F_4$ there are about 80 remote units, transmitting at frequencies $f_{4,1}$, to $f_{4,80}$, using QPSK, and letting each remote unit have a bandwidth of about 32 kHz. Six interfering remote units, each at the same frequency $f_{4,1}$, one in each of the six surrounding cells, could be at a point closest to the base station of cell A, thereby creating maximum interference. Consider FIG. 5. Since the interfering power received at the base station of cell A comes from remote units $u_B$ and $u_C$, and noting that the power decreases with the $4^{th}$ power of the distance, band $F_4$ has:

$$\frac{S}{I} = \frac{P_A/(5)^4}{3[P_B/(8)^4 + P_c/(9)^4]} \qquad (3)$$

Assuming that $P_A=P_B=P_C$, which would occur in a system with no power control, then $$\frac{S}{I} = 1.34 = 1.3 \text{ dB} \qquad (4)$$

In such a worst-case scenario, which, of coursehas an extremely small probability of occurrence, the S/I ratio is unacceptably small.

Sectored Antennas to Minimize Interference.

Figure 6:
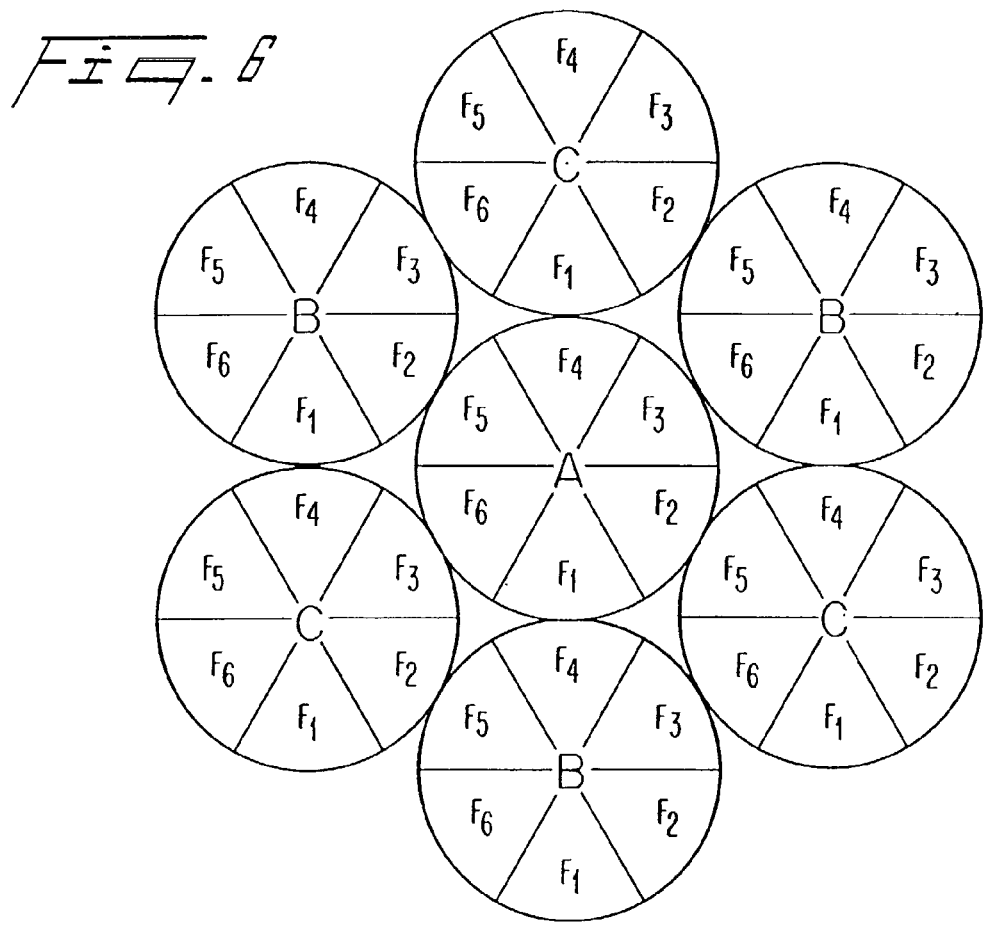
FIG. 6 shows coverage area for six-sector antennas.

In order to reduce the worst-case S/I condition, base antenna means may be used for sectoring the coverage area into a plurality of sectors. The base-sector means is shown, by way of example, with six-sector antennas selected, in FIG. 6. In this case, each base station uses six antennas and each antenna transmits to remote units in its sector. When a selected-remote unit is located within a particular sector and a particular geographic region, the base controller sets the set of frequencies used by the base-hopping device. The base station can determine in which of the six sectors the mobile unit is located, by comparing the relative field strength received from a transmitter located on the remote unit, at each of the six antennas. Alternatively, a remote unit may relay location information to the base station through a command channel. The remote unit can determine its location using well-known geolocation techniques with reference to several base stations.

Figure 7:
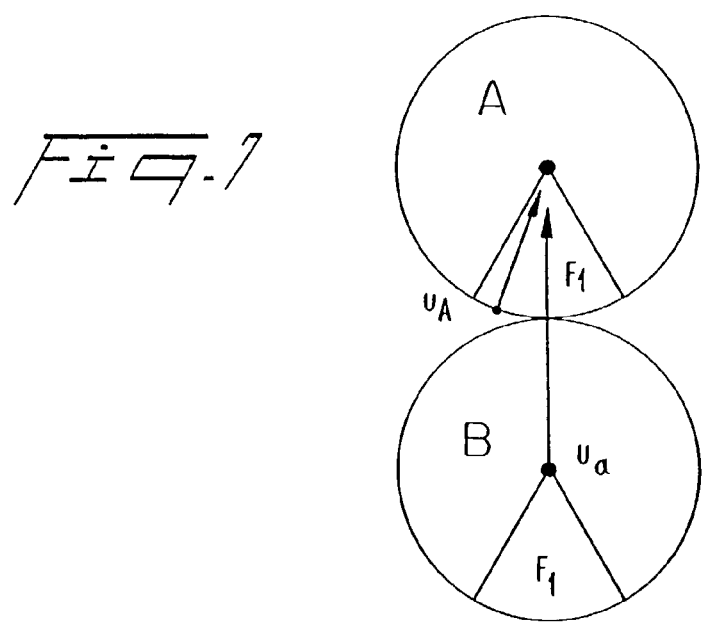
FIG. 7 shows that interference is reduced by $2^4=16$.

The worst-case remote unit-to-base station interference occurs from a single remote unit whose signal can be seen from the base station. This is illustrated in FIG. 7 where remote unit $u_A$ communicates in band $F_1$, at a frequency $f_1$, to the base station at cell A. Remote unit $u_B$, in cell B, below cell A in the figure, also is transmitting in band $F_1$ at the same frequency $f_1$. Since remote unit $u_B$ is within the antenna•beamwidth of the base station in cell A, remote unit $u_B$ interferes with remote unit $u_A$. However, it is readily seen that no other remote unit in any of the other adjacent cells interferes. Thus, assuming $P_A=P_B$, the worst-case S/I produced by remote unit $u_B$ is S/I=16, i.e., 12 dB, since the worst-case distance ratio is 2:1 and $2^4$=16. The average S/I is, of course, much higher.

Regions and Sectored Antennas Can Reduce Interference

In order to theoretically eliminate the intercell interference, consider the use of six concentric region rings with six-segment antennas. As seen from FIG. 8 each ring is sectored so as to ensure no interference from remote units in adjacent cells.

Consider the remote unit $u_A$ shown in the outer region in cell A in frequency band $F_2$. Interference to its sectored base station in cell A could only come from a remote unit $u_B$ in inner ring at cell B in the band $F_2$. Since band $F_2$ is divided into six sub-bands, band $F_2$ readily is arranged such that the frequencies used in frequency band $F_2$ of cell A, designated $F_2(A)$, do not correspond to the frequencies used in frequency band $F_2$ of cell B, designated $F_2(B)$ within the same sector. Using this technique, consisting of concentric regions and sectors, there is fro interference between adjacent cells, ignoring multipath.

Forward Power Control

Forward Power Control (FPC) is the adjustment of the power transmitted by the base station to achieve a fixed receive power at the remote unit. FPC can be employed to minimize the base station to remote unit interference. The purpose of FPC is to ensure that the signal power transmitted by the base station, received in any frequency region, is the same. Thus, in FIG. 9, using FPC, more power would be transmitted to remote units far from the base station than to remote units close to the base station. Assuming a perfect FPC, the power received by a remote unit $u_1$, at distance r, from the base station, would be the same as the power received by a remote unit $u_2$, a distance $r_2$ from the base station. If their transmitter powers are $P_1$ and $P_2$, respectively, then $$\frac{P_1}{P_2} = \left(\frac{r_1}{r_2}\right)^4 \quad (5)$$

Figure 9:
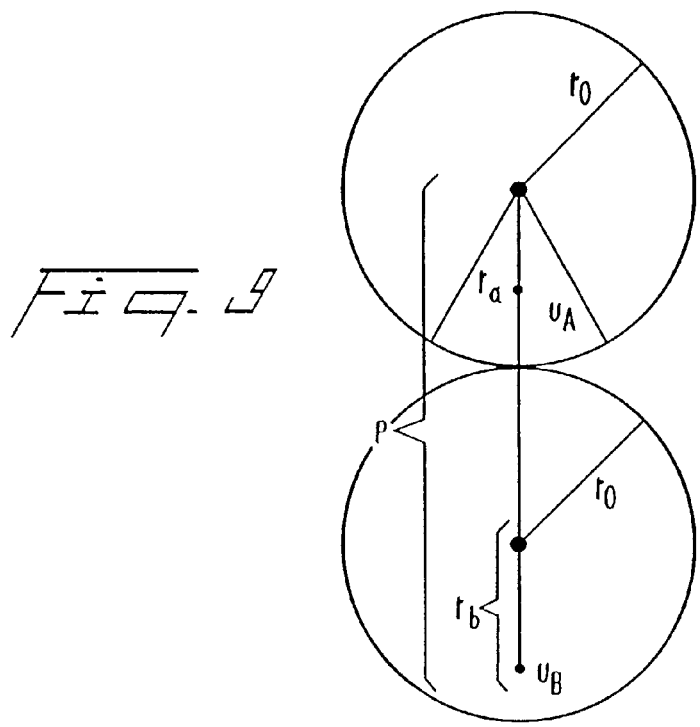
FIG. 9 is an illustration used for a calculation of signal to-interference ratio produced at a remote unit due to an interfering base station.

Referring to FIG. 9, base station A transmits, at frequency $f_1$, power $P_A$ to remote unit $u_A$ and base station B transmits, at frequency $f_1$, a power $P_B$ to remote unit $u_B$. Remote unit $u_B$ then receives a signal power S equal to $$S = P_B/(r_b)^4 \quad (6)$$

and an interfering power, I, where $$I = P_A/r_A \quad (7)$$

If FPC were not used, $P_A = P_B$ and $$\frac{S}{I} = \left(\frac{P}{r_a}\right)^4 \quad (8)$$

If FPC is used, $P_A/(r_a)^4 = P_B/(r_b)^4$ so that $$\frac{S}{I} = \left(\frac{P}{r_b}\right)^4 \quad (9)$$

Thus, FPC does not consistently provide a S/I improvement. For simplicity, the present invention does not require FPC although it could be used.

Reverse Power Control

Reverse Power Control (RPC) requires that a remote unit is received at its base station with the same power regardless of where in the cell the remote unit is positioned.

To determine if RPC can improve the S/I, refer to FIG. 9. Assume that cell A and cell B have a radius $r_o$. Let remote unit $u_A$ be placed a distance $r_a$ from the first base station and remote unit $u_B$ be placed a distance $r_b$ from the second base station, and on a line connecting both base stations. Then the S/I is $$\frac{S}{I} = \frac{P_B/r_b^4}{P_A/(2r_o+r_b)^4} = \frac{P_B}{P_A}\left[\frac{2r_o+r_b}{r_b}\right]^4 \quad (10)$$

Without RPC, $$\frac{S}{I} = \left(\frac{2r_o+r_b}{r_b}\right)^4 \quad (11)$$

However, with RPC, $$\frac{S}{I} = \left(\frac{2r_o+r_b}{r_a}\right)^4 \quad (12)$$

Since $r_b$ can be larger or smaller than $r_a$, this type of RPC has no consistent advantage in this system.

Rings and Sectored Antennas Can Increase Capacity

Figure 8:
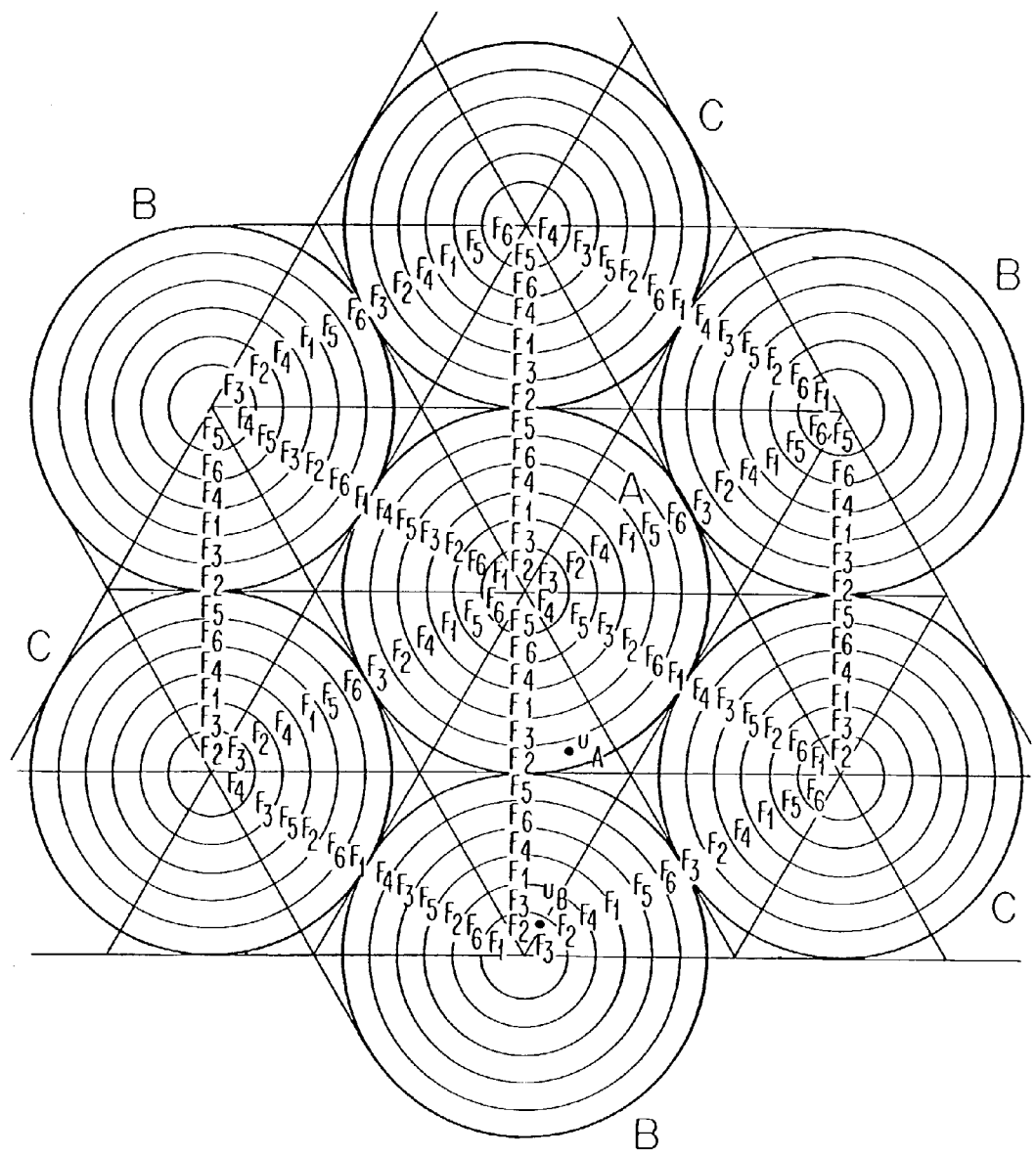
FIG. 8 illustrates a FH/CDMA system, with multiple cells, using concentric frequency bands and six-sector antennas at each base station.

The capacity of the system depicted in FIG. 8 can be increased by a factor of six if:

(1) Each sectored region contains all of the frequencies allocated to that region. For example, each region $F_2$ contains the same 80 frequencies.

(2) The power transmitted by a remote unit in a given region is controlled by the base station and follows the rule shown below:

| Region | Band* | Power Transmitted |
|---|---|---|
| Inner, | $F_2$ | $P_o$ |
|  | $F_3$ | $P_o$ |
|  | $F_1$ | $P_o$ |
|  | $F_4$ | 1.4 $P_o$ |
|  | $F_6$ | 3 $P_o$ |
| Outer, | $F_5$ | 10 $P_o$ |

Using this set of transmitted powers, the worst-case S/I is approximately 15 dB and occurs for remote units in bands $F_1$ and $F_4$. The values for the transmitted power shown above have been selected to approximately maximize the S/I ratio, neglecting adjacent sector interference and multipath. However, other values of power can be selected without significant performance degradation.

If the spacing of the regions were selected to allow an equal remote unit density, i.e., each region is of equal area as shown in FIG. 4, then the power transmitted in each region is approximately as follows:

| Region | Band* | Power Transmitted |
|---|---|---|
| Inner, | $F_2$ | $P_o$ |
|  | $F_3$ | $P_o$ |
|  | $F_1$ | $P_o$ |
|  | $F_4$ | 1.12 $P_o$ |
|  | $F_6$ | 1.5 $P_o$ |
| Outer, | $F_5$ | 2.4 $P_o$ |

These bands are those shown in the upper segment of cells A, B and C in FIG. 8. The worst-case S/I is approximately 8.5 dB. The values of the transmitted power shown above have been selected to approximately maximize the S/I ratio, neglecting adjacent sector interference and multipath. However, other values of power can be selected without significant performance degradation.

Choosing the Hop Duration

Figure 10:
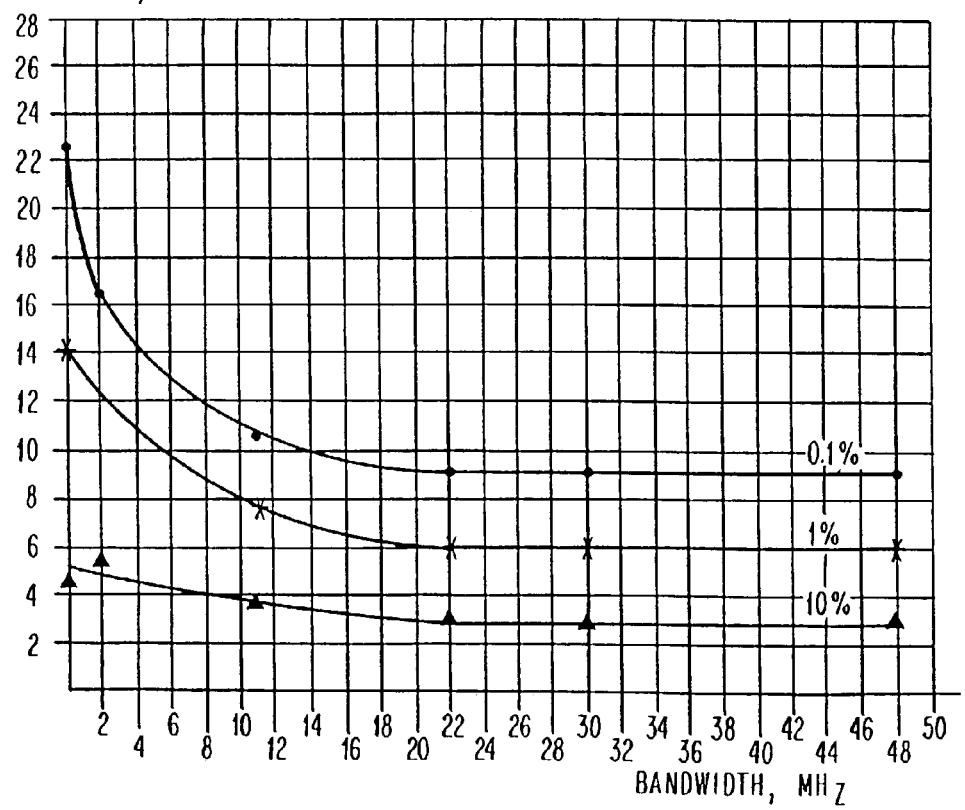
FIG. 10 illustrates fade for a narrowband signal.

The above discussion neglects the effect on system, performance of multipath fading. FIG. 10 illustrates that a narrowband, 32 kHz, signal can fade by more than 14 dB, one percent of the time. When such fades occur, the S/I may decrease dramatically and produce a significant number of errors.

The primary purpose of frequency hopping is to move a signal at a frequency $f_i$, which is fading, to a new frequency $f_j$, which may not be fading. To use the entire frequency band effectively, however, all frequencies must be used, even those which fade. Unfortunately, the fading frequencies vary with geography, cars, people, and office environment, so that there is no guarantee of a good, non-fading, frequency.

Figure 11:
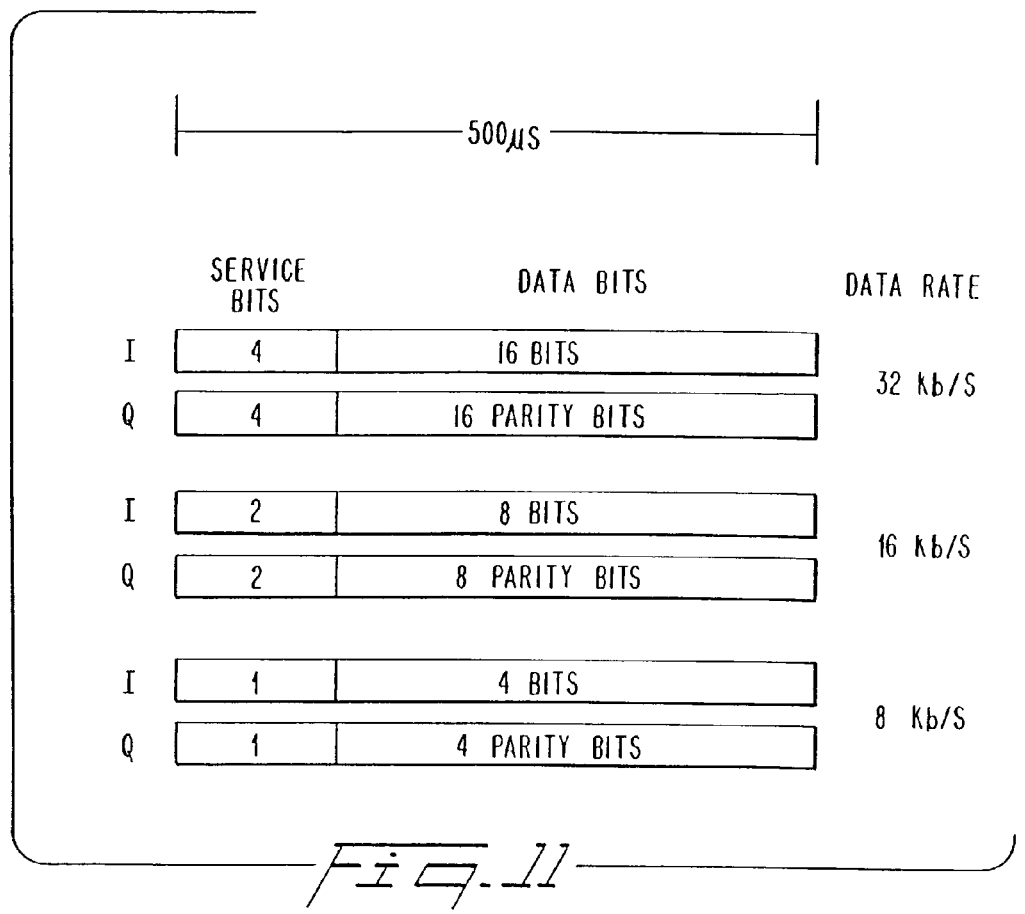
FIG. 11 is a possible frame structure.

A hopping rate can accommodate bit rates from 8 kb/s to 32 kb/s, i.e., 8 kb/s, 16 kb/s and 32 kb/s. At these and higher data rates, an equalizer may be required as a result of multipath returns causing intersymbol interference. In addition, approximately 2 kb/s signaling data is used. A proposed frame structure is shown in FIG. 11. Since the frame is 500 microseconds in duration, the hop rate is 2 khops/s. Forward error correction using a rate ½ convolutional code is then used. Erasures are used since the presence of a deep fade during a hop is readily detected. Other frame and hop rates can be chosen. For example, a 10 millisecond frame with hopping at 100 hops/second is common.

Diversity

The performance of a frequency-hopping system can be improved dramatically through the use of space diversity. With this procedure, two antennas at the base station receive the remote unit's transmission and, using the optimal maximal-ratio combining technique, obtain second-order diversity. Other combining techniques could be used. Furthermore, since the antenna which has received the stronger signal at each of the remote unit's hop frequencies $f_1$, is known, then during the next hop the base station transmits to the remote unit, at frequency $f_i$, using the antenna which received the larger power.

Figure 12:
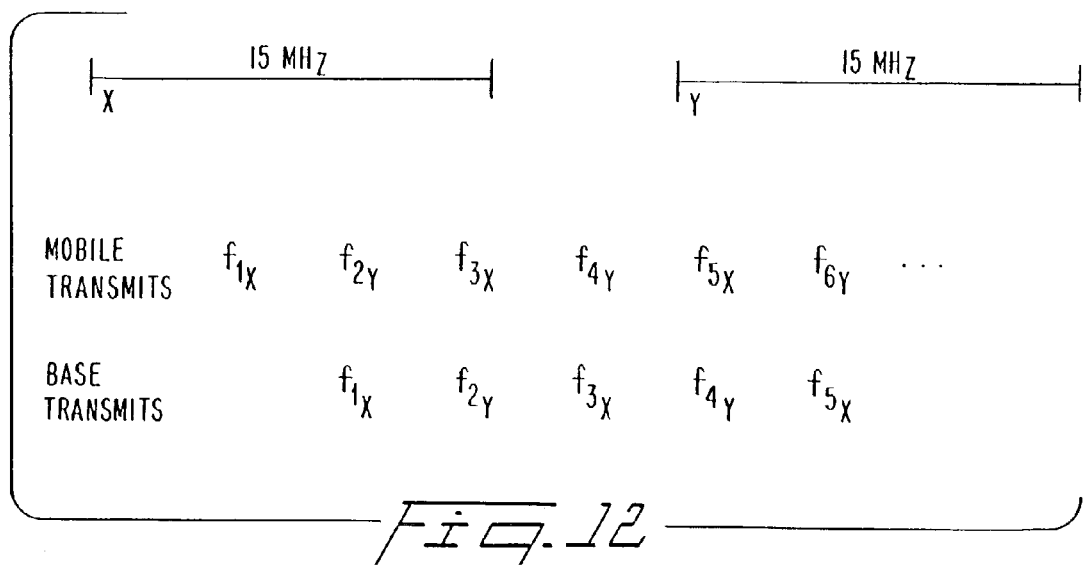
FIG. 12 illustrates how frequencies are selected for frequency hopping to achieve space diversity.

This procedure is illustrated in FIG. 12. In this figure, the transmit and receive bands are called the X and Y bands. The remote units and the base station select frequencies from both bands. Note that the base station transmits at the remote unit's hop frequency one hop later. In this case, the multipath seen is "almost" reciprocal, particularly when a frame is only 500 microseconds in duration.

Using the above procedure the base station and the remote unit each achieve second-order space diversity without any increased complexity in the remote unit's handset.

Handoff

The present invention depends on the ability of a remote unit to switch frequency bands when moving from sector to sector and/or from region to region. A corollary requirement is to provide an adequate number of frequencies in the sector to accommodate different quantities of remote units. For example, in FIG. 6 a maximum of 80 remote units can be accommodated per sector. If 81 remote units appear in a sector and only, say, remote units appear in an adjacent sector, the sector size should be adjustable to meet the demand. This section addresses these concerns.

The frequency-hopping remote unit changes frequency, i.e., hops, every 500 microseconds. Thus, every second there are 2000 hops. When the base station records a power ldrel decrease from a remote unit over a reasonably large number of hops, say 100 hops, it tells the remote unit to switch to a new band of frequencies. In addition, as the remote unit moves from sector to sector or from one cell to another, the remote unit receives a slow hopping pilot signal sent from the base station to each sector. Thus, only six pilot signals are required to effect handoff between sectors or cells. That is, the remote unit receives the pilot signals from all nearby sectors. If a pilot signal strength exceeds that of its present pilot signal by a meaningful amount, then the remote unit can request handoff. Other approaches may also be used.

Overlay

In order to overlay on the fixed service microwave user, one of two approaches can be employed. In the first approach, the remote unit users in a cell would affect, at most, one microwave user. The base station, knowing which band of frequencies is used by the microwave user, "locks-out" that band so that the number of remote units in the band is significantly reduced. For example, if the allocated band is 15 MHz and the microwave user has a bandwidth of 10 MHz, then the number of remote units in cell is only one-third of the maximum possible capacity. In the second approach, the number of remote units that are allowed on the lband occupied by the microwave user is increased until interference is detected by the microwave user. Should the microwave user's signal fade, the number of remote units is decreased.

Impact of Mult Math Fading on FH/CDMA

In this section, the signal power lost due to fading, i.e., the fade depth, required for spread spectrum systems as a function of bandwidth, is presented.

Experiments were performed within buildings, in offices, outdoor in the suburbs and outdoor in New York City. Approximately one million data points were processed to obtain the curves shown below.

Figure 13:
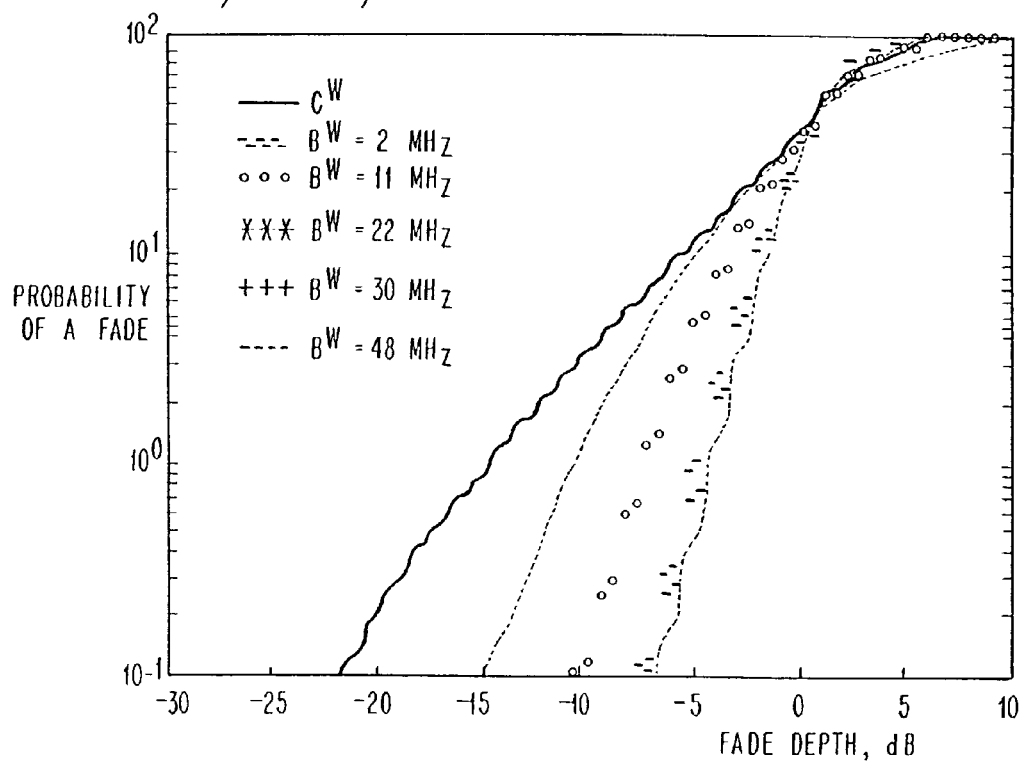
FIGS. 13–15 shows the probability of the received signal power differing from the mean signal power.
Figure 14:
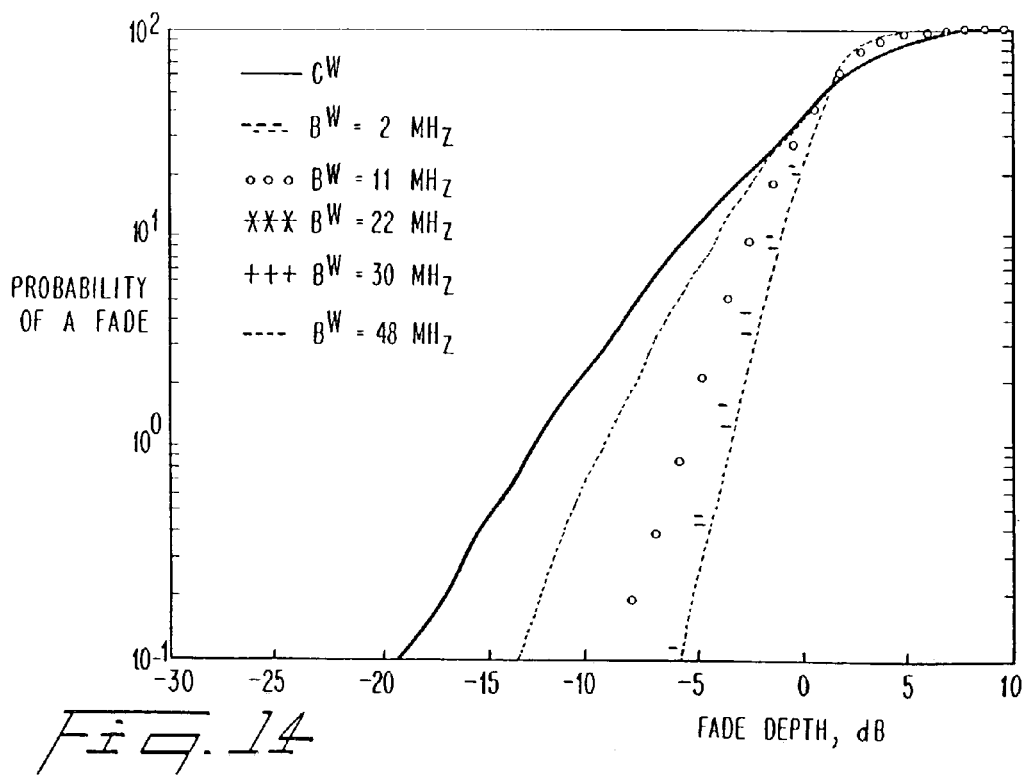
Figure 15:
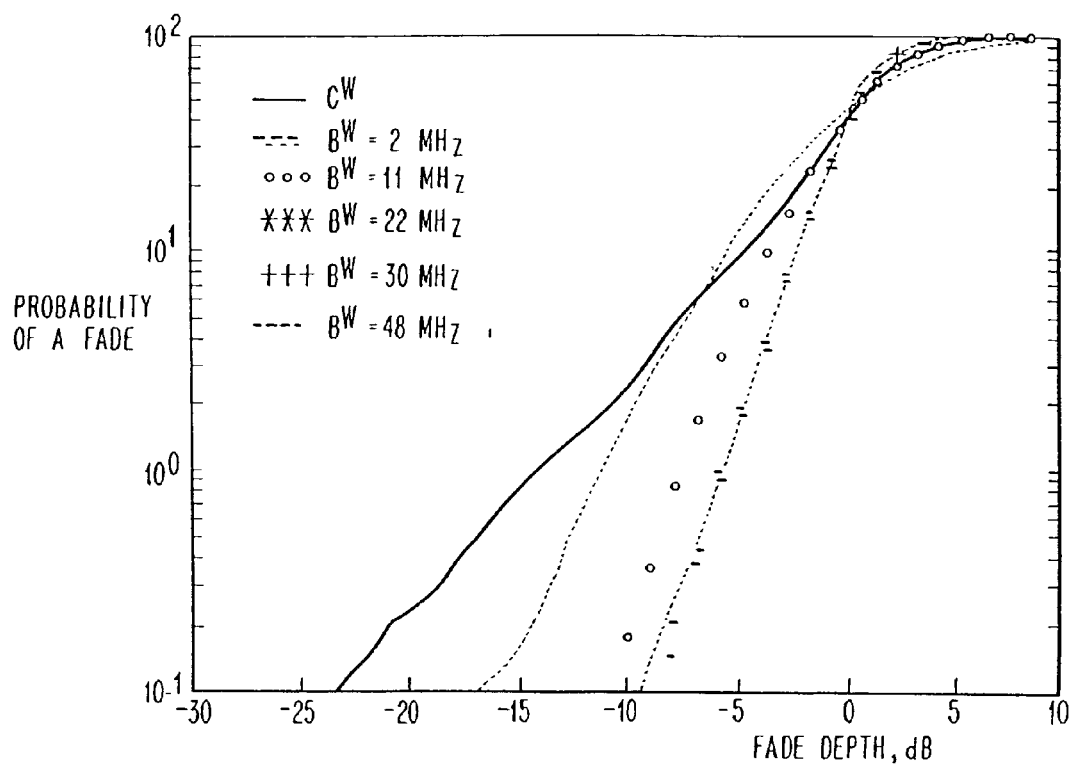

FIGS. 13, 14, and 15 show the probability of the received signal power differing from the mean signal power by more than a prescribed amount, called the fade depth, as a function of bandwidth. For example, in FIG. 13, the data was taken in the suburban community of Port Washington, N. Y. For a bandwidth of 11 MHz, the probability is $10^{-3}$ that the received signal's power fades by more than 10 dB from its median value.

The results shown in this figure for the bandwidths of 11 MHz, 22 MHz, 30 MHz and 48 MHz all yield similar results. However, the fading at 2 MHz and for a CW signal show that very large fade depths can occur.

Figure 16:
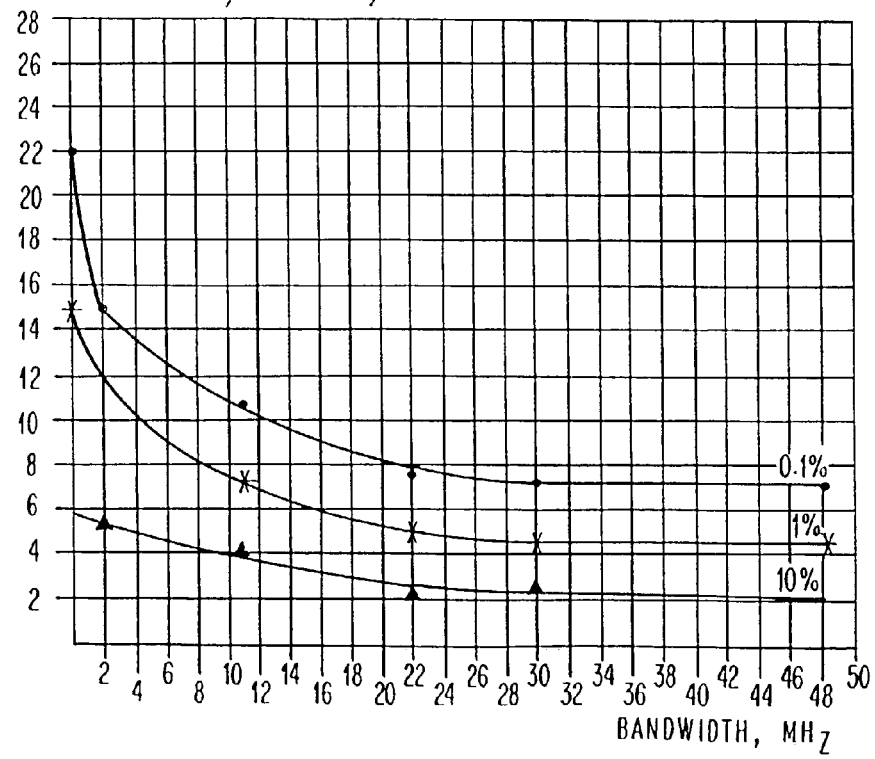
FIG. 16 is a redrawn plot of FIG. 14.

FIGS. 10, 16, and 17 are redrawn plots of FIGS. 13, 14, and 15 for three different probabilities, $10^{-3}$, $10^{-2}$ and $10^{-1}$. Note that the variation in fade depth is less than 1 dB for bandwidths exceeding −20 MI4z. At 15 MHz, a bandwidth under consideration by the Federal Communications Commission, a variation not exceeding 2 dB is observed.

Narrowband spread spectrum systems, using ct bandwidth of about 1 MHz, fade by 15–19 dB depending on the environment. These are the numbers for a probability of $10^{-3}$.

From the data, the fade depth increases as the bandwidth decreases, and increases in fade depth becomes significant at bandwidths of less than 11 MHz. Since a FH/CDMA system uses an instantaneous bandwidth equal to the bit rate, fading of more than 5 dB occurs less than 10% of the time; however, with a probability of $10^{-3}$ one can have fades exceeding 23 dB.

This patent has presented the design and initial performance analysis of a FH/CDMA microcellular communication system. The system design was based on the philosophy that the most important consideration was that of maximizing channel capacity. Therefore, the resulting design, while practical, was nonetheless complex; it made use of coordinated frequency subbands and antenna sectors to minimize multiple access interference. Thus, while a design of this type requires, for example, more handoffs than might otherwise be needed, it results in a highly effective usage of the frequency spectrum.

It will be apparent to those skilled in the art that various modifications can be made to the frequency hopping code division multiple access system and method of the instant invention without departing from the scope or spirit of the invention, and it is intended that the present invention cover modifications ant variations of the frequency hopping code division multiple access system and method provided they come within the scope of the appended claims and their equivalents.

What is claimed is:

1. A method for use in a frequency hopping code division multiple access communication system, the method comprising:
    transmitting data by frequency hopping over a set of frequencies from a remote unit to a base station;
    providing a plurality of antennas at a base station for receiving the transmitted frequency hopped data, wherein each of the plurality of antennas corresponds to a unique geographic sector of the base station;
    determining an optimal combining of each antenna's received hopped data for a particular frequency; and
    selectively transmitting data using at least one of the plurality of antennas from the base station to the remote unit over the particular frequency, the selective transmitting selected using the optimal combining.

2. The method of claim 1 wherein the selectively transmitting selects an antenna for transmission having a highest received power of the received hopped data.

3. The method of claim 2 wherein the plurality of antennas is two antennas.

4. A frequency hopping base station comprising:
    a plurality of antennas for receiving a frequency hopped data signal for a particular user, the frequency hopped data signal is hopped over a set of frequencies, wherein each of the plurality of antennas corresponds to a unique geographic sector of the coverage area;
    means for determining an optimal combining of each antenna's received version of the frequency hopped data signal for a particular frequency of the set of frequencies; and
    means for selectively transmitting data using the plurality of antennas to the particular user over the particular frequency, the selectively transmitting selected using the optimal combining.

5. The base station of claim 4 wherein the selectively transmitting selects an antenna for transmission having a highest received power of the received hopped signal.

6. The base station of claim 5 wherein the plurality of antennas is two antennas.

* * * * *

UNITED STATES PATENT AND TRADEMARK OFFICE
CERTIFICATE OF CORRECTION

PATENT NO. : 7,142,582 B2
APPLICATION NO. : 10/209588
DATED : November 28, 2006
INVENTOR(S) : Donald L. Schilling It is certified that error appears in the above-identified patent and that said Letters Patent is hereby corrected as shown below:

At column 1, line 41, before the third use of "MHz", delete "2160 2200" and insert therefor --2160–2200--.

At column 3, line 52, after "13-15", delete "shows" and insert therefor --show--.

At column 4, line 13, after the word "select", delete ";".

At column 5, line 2, before the word "modulation", delete "(FS K)" and insert --(FSK)--

At column 5, line 4, before the word "any", delete "maybe" and insert therefor --may be--.

At column 5, line 17, before the word "multiplexer", delete "Abase" and insert --A base--

At column 5, line 28, before the word "suitable", delete "forth" and insert therefor --form--.

At column 6, line 41, after the words "are all", delete "incorporation" and insert therefor --incorporated--.

At column 6, line 57, before the word "transmits", delete "u1" and insert --$u_1$--.

At column 7, line 13, before the word "located", delete "–".

At column 7, line 21, after the word "base", delete ",".

At column 7, line 36, before the words "in cell", delete "u," and insert therefor --$u_1$--.

At column 8, line 15, after the words "which, of", delete "coursehas" and insert therefor --course has--.

At column 8, line 66, after the words "there is", delete "fro" and insert therefor --no--.

At column 11, line 31, after the word "frequencies", delete "$f_1$," and insert therefor --$f_i$,--.

At column 11, line 58, after the word "power", delete "ldre" and insert therefor --level--.

UNITED STATES PATENT AND TRADEMARK OFFICE
CERTIFICATE OF CORRECTION

PATENT NO. : 7,142,582 B2
APPLICATION NO. : 10/209588
DATED : November 28, 2006
INVENTOR(S) : Donald L. Schilling It is certified that error appears in the above-identified patent and that said Letters Patent is hereby corrected as shown below:

At column 12, line 19, after the words "Impact of", delete "Mult Math" and insert therefor --Multi-Path--.

At column 12, line 43, after "–20", delete "MI4z." and insert therefor --MHz.--.

At column 13, line 6, after the word "modifications", delete "ant" and insert therefor --and--.

Signed and Sealed this

Nineteenth Day of June, 2007

JON W. DUDAS
*Director of the United States Patent and Trademark Office*